US 8,924,957 B1

(12) United States Patent
Newstadt et al.

(10) Patent No.: US 8,924,957 B1
(45) Date of Patent: Dec. 30, 2014

(54) SYSTEMS AND METHODS FOR SIMULTANEOUSLY INSTALLING USER-INPUT-DEPENDENT SOFTWARE PACKAGES ON MULTIPLE DEVICES

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1288 days.

(21) Appl. No.: 12/412,721

(22) Filed: Mar. 27, 2009

(51) Int. Cl.
*G06F 9/445* (2006.01)

(52) U.S. Cl.
CPC . *G06F 8/61* (2013.01); *G06F 9/445* (2013.01); *G06F 8/65* (2013.01); *G06F 8/60* (2013.01)
USPC ............ 717/178; 717/177; 717/174; 717/173

(58) Field of Classification Search
CPC ................ G06F 8/61; G06F 8/60; G06F 8/65
USPC ..................... 717/178; 715/759, 803; 709/203
See application file for complete search history.

(56) References Cited

U.S. PATENT DOCUMENTS

| | | | | |
|---|---|---|---|---|
| 5,920,313 A * | 7/1999 | Diedrichsen et al. | ......... | 715/767 |
| 6,026,500 A * | 2/2000 | Topff et al. | ...................... | 714/26 |
| 7,080,381 B2 * | 7/2006 | Hannigan et al. | ............. | 719/313 |
| 7,398,272 B2 * | 7/2008 | Hindawi et al. | ............... | 709/203 |
| 8,015,450 B1 * | 9/2011 | Cooley et al. | ................. | 714/38.1 |
| 8,266,091 B1 * | 9/2012 | Gubin et al. | ..................... | 706/52 |
| 2004/0031030 A1 * | 2/2004 | Kidder et al. | .................. | 717/172 |
| 2007/0283346 A1 * | 12/2007 | Delgrosso et al. | ............ | 717/176 |
| 2008/0086627 A1 * | 4/2008 | Splaine et al. | ................ | 712/227 |
| 2008/0229231 A1 * | 9/2008 | Delia et al. | ..................... | 715/781 |
| 2013/0104118 A1 * | 4/2013 | Somani et al. | ................ | 717/173 |

* cited by examiner

*Primary Examiner* — Anna Deng
*Assistant Examiner* — Brahim Bourzik
(74) *Attorney, Agent, or Firm* — ALG Intellectual Property, LLC

(57) ABSTRACT

Computer-implemented methods and systems for simultaneously installing user-input-dependent software packages on multiple devices are disclosed. In one example, an exemplary method for performing such a task may comprise: 1) initiating installation of a software package on each of a plurality of client devices, 2) receiving, from each client device, a visual image generated during installation of the software package that depicts an installation step that requires user input, 3) consolidating the visual images into a consolidated view, 4) displaying, via an installation-management interface, the consolidated view to a user of the computing device, 5) receiving, via the installation-management interface, user input from the user for completing the installation step, and then 6) completing the installation step by sending the user input to each client device.

20 Claims, 8 Drawing Sheets

SYSTEMS AND METHODS FOR SIMULTANEOUSLY INSTALLING USER-INPUT-DEPENDENT SOFTWARE PACKAGES ON MULTIPLE DEVICES

BACKGROUND

Many existing software-deployment solutions allow administrators to deploy and run installation packages on remote computers. In order to accomplish this task, software-deployment solutions must typically support non-interactive modes or other automation mechanisms. For example, software-deployment solutions must typically allow administrators to import custom command-line or configuration files that contain specific information and/or instructions necessary to complete the installation process on each remote computer.

Unfortunately, due to the costs associated with creating software-deployment solutions and packages, many common software packages, such as software packages published by small vendors or by vendors that target consumer markets, do not support non-interactive modes or other automation mechanisms. If software packages such as these do not provide or support such deployment solutions, then software administrators within an enterprise that seeks to deploy such software packages may be forced to expend considerable time and effort manually deploying the software packages within the enterprise. In addition, as more and more software packages provided by small or consumer-oriented vendors are deployed within enterprises, the time and cost associated with manually deploying these software packages may continue to rise. As such, the instant disclosure identifies a need for systems and methods for quickly and simultaneously installing user-input-dependent software applications on multiple machines.

SUMMARY

The instant disclosure describes various systems and methods for simultaneously installing user-input-dependent software packages on multiple devices. As will be described in greater detail below, an exemplary method for performing such a task may comprise: 1) remotely initiating installation of a user-input-dependent software package on each of a plurality of client devices, 2) receiving, from each client device during the installation process, a screen capture of a window generated and displayed during an installation step that requires user input, 3) consolidating the screen captures into a consolidated view, 4) displaying, via an installation-management interface, the consolidated view to a user (such as an administrator or IT personnel) that is managing the installation process, 5) receiving, via the installation-management interface, user input (such as keystrokes and mouse clicks) from the user for completing the installation step, and then 6) completing the installation step by sending the user input to each client device.

In some examples, the installation-management interface may enable users (such as administrators and IT personnel) to identify or specify client devices that should execute the software package. In this example, the systems disclosed herein may initiate installation of the software package by, upon receiving instructions from the user via the installation-management interface: 1) storing the software package on a file server and then 2) instructing each identified client device to download and execute the software package. The installation-management interface may also enable users to upload, and instruct client devices to download and execute, command-line-interpreter files (such as batch files and scripts) programmed to initiate installation of the software package.

The system may consolidate the screen captures received from client devices in a variety of ways. For example, if the system determines, by analyzing the screen captures, that the screen captures merely represent instances of a single window displayed during an installation step, then the system may: 1) identify differences in content between the instances of the window and 2) highlight, in a single consolidated view displayed in the installation-management interface, these differences. For example, the system may place a visual indicator (such as a hashed or grayed-out box) within an area in the single consolidated view displayed within the installation-management interface that corresponds to a location in the window where the differences in content between the instances of the window occur (such as an area in an installation window that displays a unique serial number for each client device participating in the installation process).

In this example, the user may view the unique content displayed on each client device by selecting or manipulating the visual indicator. In some examples, the user may request the system to export this information to a file that contains the screen captures themselves, text obtained from the screen captures through object-character recognition, and/or information that identifies both data obtained from each screen capture and the client device that is responsible for generating this data.

In another example, if the system determines, by analyzing the screen captures, that the screen captures represent instances of different windows displayed during an installation step, then the system may consolidate the screen captures based on the windows they are associated with. For example, if the system determines that the screen captures represent instances of both a first window (such a window that requires user input) and a second window (such as an error window that indicates there is insufficient disk space to complete the installation) displayed during an installation step, then the system may: 1) identify a first subset of the screen captures that represent instances of the first window, 2) identify a second subset of the screen captures that represent instances of the second window, 3) consolidate the first subset of screen captures into a first consolidated view displayed in the installation-management interface, and 4) consolidate the second subset of screen captures into a second consolidated view displayed in the installation-management interface.

In some examples, the installation-management interface may enable a user to view a list of client devices that are displaying a particular window. The installation-management interface may also enable a user to upload files that contain user input (such as device-specific activation keys) required to complete an installation step.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
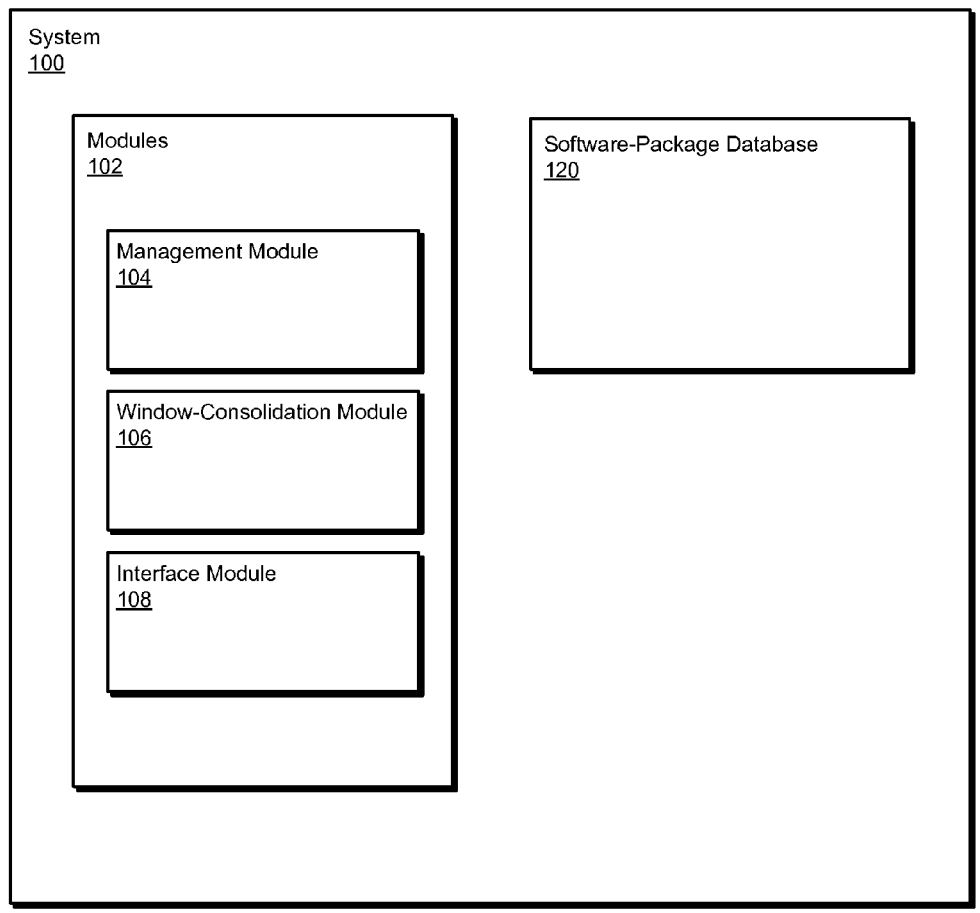
FIG. 1 is a block diagram of an exemplary system for simultaneously installing user-input-dependent software packages on multiple devices according to one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for simultaneously installing user-input-dependent software packages on multiple devices. The phrase "user-input-dependent software packages," as used herein, generally refers to software applications and programs that require user input in order to be successfully installed on a computing device. Examples of user-input-dependent software packages include, without limitation, consumer-oriented software packages and other forms of software-installation packages that do not support automated installation mechanisms (such as non-interactive-installation modes).

Figure 2:
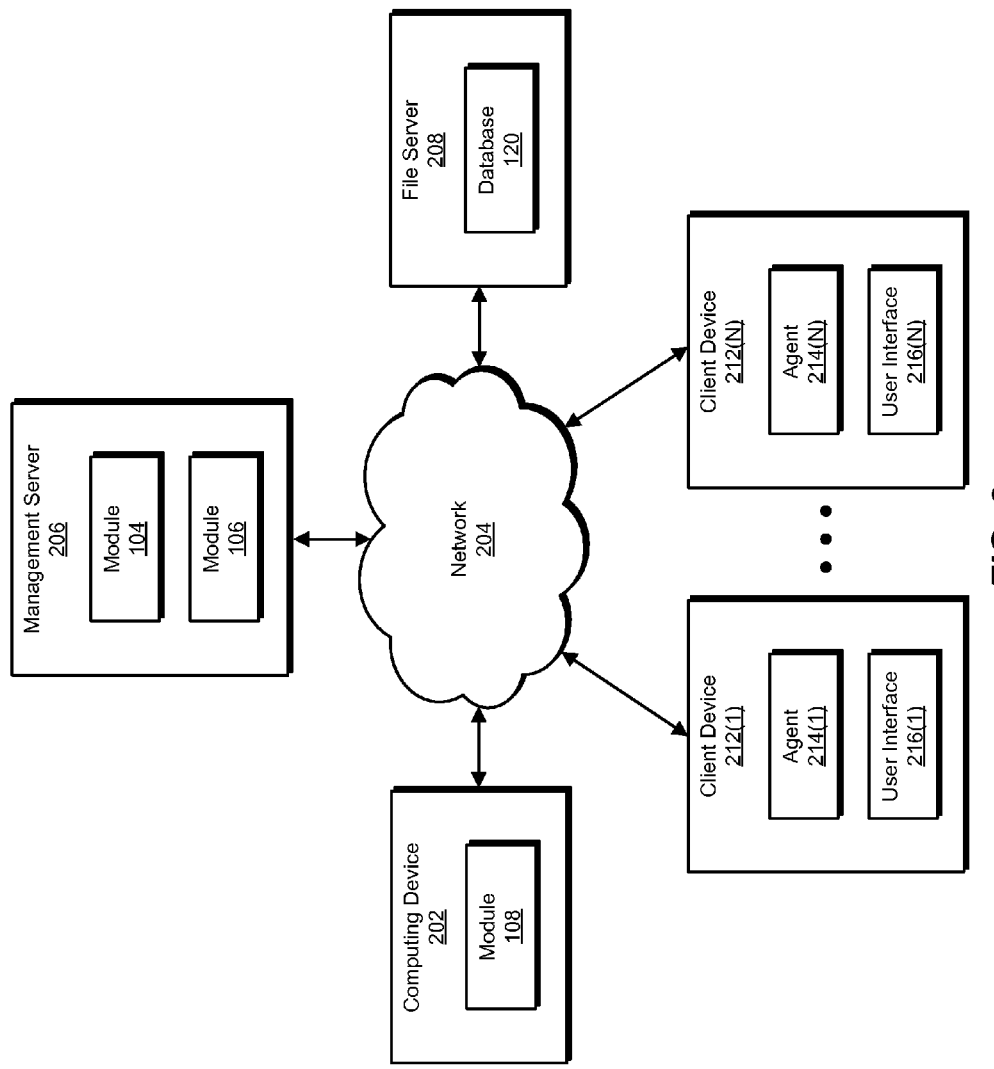
FIG. 2 is a block diagram of an exemplary implementation of the exemplary system illustrated in FIG. 1.

The following will provide, with reference to FIGS. 1-2, detailed descriptions of exemplary systems for simultaneously installing user-input-dependent software packages on multiple devices. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for simultaneously installing user-input-dependent software packages on multiple devices. As illustrated in this figure, exemplary system 100 may comprise one or more modules for performing one or more tasks. For example, and as will be explained in greater detail below, exemplary system 100 may comprise a management module 104 programmed to initiate the simultaneous installation of a software package on a plurality of client devices. Management module 104 may also send user input received from an installation-management interface to these client devices in order to complete various user-input-dependent installation steps.

Exemplary system 100 may also comprise a window-consolidation module 106 programmed to receive, from each client device participating in the installation process, a screen capture of a window generated and displayed during an installation step that requires user input. As will be explained in greater detail below, window-consolidation module 106 may also be programmed to: 1) consolidate these screen captures into at least one consolidated view and 2) provide this consolidated view to the installation-management interface.

In addition, exemplary system 100 may comprise an interface module 108 programmed to generate an installation-management interface. As will be explained in detail below, this installation-management interface may: 1) receive user input for initiating the simultaneous installation of a software package on a plurality of client devices, 2) display consolidated views of screen shots received from client devices, and 3) receive user input for completing the user-input-dependent installation steps displayed in the consolidated views. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and management server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also comprise a software-package database 120. As will be explained in greater detail below, software-package database 120 may contain, or receive and store, software packages. In some examples, client devices (such as client devices 212(1)-212(N) in FIG. 2) may be instructed to download and execute these software packages from software-package database 120.

Software-package database 120 may represent portions of a single database or computing device or a plurality of databases or computing devices. Software-package 120 may also represent a portion of one or more computing devices. For example, software-package 120 may represent a portion of computing device 202, management server 206, and/or file server 208 in FIG. 2, computing system 710 in FIG. 7, and/or portions of exemplary network architecture 800 in FIG. 8. Alternatively, software-package database 120 in FIG. 1 may represent one or more physically separate devices capable of being accessed by a computing device, such as computing device 202, management server 206, and/or file server 208 in FIG. 2, computing system 710 in FIG. 7, and/or portions of exemplary network architecture 800 in FIG. 8.

FIG. 2 is a block diagram of an exemplary system 200 for simultaneously installing user-input-dependent software packages on multiple devices. As illustrated in this figure, exemplary system 200 may comprise a computing device 202 in communication with a management server 206, a file server 208, and a plurality of client devices 212(1)-212(N) via a network 204.

As detailed above, one or more of modules 102 in FIG. 1 may be stored and configured to run on computing device 202, management server 206, and/or file server 208. In one embodiment, and as will be described in greater detail below, modules 102 may be programmed to cause computing device 202, management server 206, and/or file server 208 to: 1) remotely initiate installation of a user-input-dependent software package on client devices 212(1)-212(N), 2) receive, from each of client devices 212(1)-212(N) during the installation process, a screen capture of a window generated and displayed during an installation step that requires user input, 3) consolidate the screen captures into a consolidated view, 4) display, via an installation-management interface on computing device 202, the consolidated view to a user of computing device 202 (such as an administrator or IT personnel managing the installation process), 5) receive, via the installation-management interface on computing device 202, user input (such as keystrokes and mouse clicks) from the user for completing the installation step, and then 6) complete the installation step by sending the user input to client devices 212(1)-212(N).

As will be explained in greater detail below, in some examples agents 214(1)-214(N) on client devices 212(1)-212(N) may, for each of client devices 212(1)-212(N): 1) receive an instruction to download and execute a software package from file server 208, 2) download and execute the software package from file server 208, 3) capture a screen of a window generated and displayed during an installation step that requires user input, 4) send this screen capture to window-consolidation module 106 on management server 206, 5) receive user input for completing the installation step from interface module 108 on computing device 202 (via management module 104 on management server 206), and then 6) complete the installation step by feeding the user input into the window in question.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 710 in FIG. 7, and any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., GSM Network), exemplary network architecture 800 in FIG. 8, or the like. Network 204 may facilitate communication or data transfer using wireless or wired connections. In one embodiment, network 204 may facilitate communication between computing device 202, management server 206, file server 208, and/or client devices 212(1)-212(N).

Management server 206 generally represents any type of computing device that is capable of managing the simultaneous installation of a user-input-dependent software package on a plurality of client devices. Examples of management server 206 include, without limitation, application servers and database servers configured to provide various services and/or run certain software applications.

File server 208 generally represents any type or form of network-accessible storage device. As explained above, in some examples file server 208 may comprise software-package database 120, which may contain software packages that may be downloaded by client devices 212(1)-212(N), as needed.

Client devices 212(1)-212(N) generally represent any type or form of computing device capable of reading computer-executable instructions. Examples of client devices 212(1)-212(N) include, without limitation, laptops, desktops, servers, cellular phones, personal digital assistants (PDAs), multimedia players, embedded systems, combinations of one or more of the same, exemplary computing system 710 in FIG. 7, and any other suitable computing device. In one example, client devices 212(1)-212(N) may represent one or more virtual machines.

Figure 3:
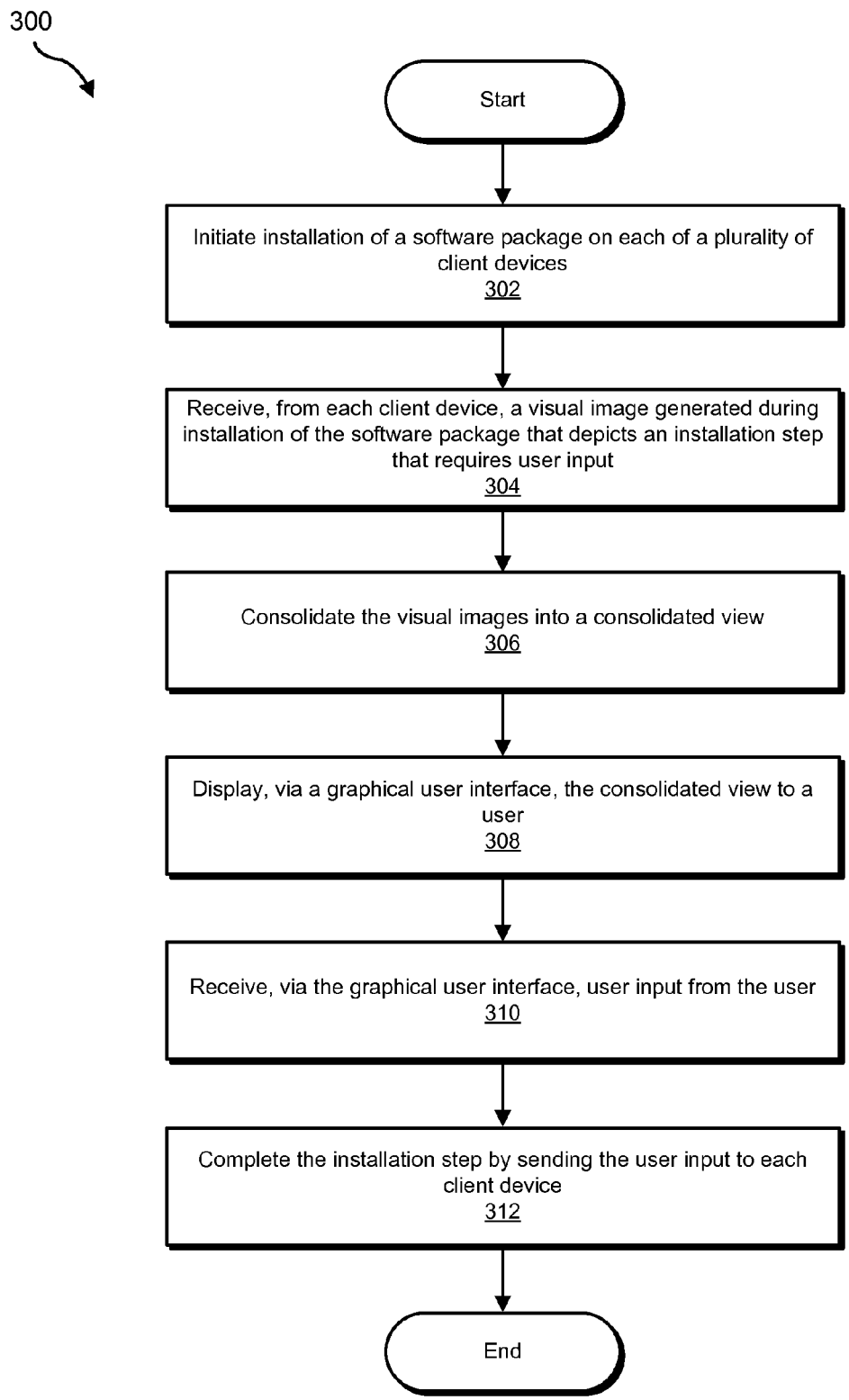
FIG. 3 is a flow diagram of an exemplary method for simultaneously installing user-input-dependent software packages on multiple devices according to one embodiment.

FIG. 3 is a flow diagram of an exemplary computer-implemented method 300 for simultaneously installing user-input-dependent software packages on multiple devices. As illustrated in this figure, at step 302 the system may initiate the installation of a software package on each of a plurality of client devices. For example, management module 104 in FIG. 1 (which may, as detailed above, be stored and configured to run on management server 206 in FIG. 2) may initiate the simultaneous installation of a software package on client devices 212(1)-212(N).

The system may initiate the simultaneous installation of a software package on a plurality of client devices in a variety of ways. In one example, interface module 108 on computing device 202 in FIG. 2 may receive, via an installation-management interface generated by interface module 108, an identification from a user (such as an administrator or IT personnel) of a plurality of client devices (such as two or more of client devices 212(1)-212(N)) that should begin installation of a software package. Upon receiving this instruction, interface module 108 may instruct management module 104 on management server 206 to initiate installation of the software package on the identified client devices. Management module 104 may then cause management server 206 to instruct the identified client devices to download and execute the software package from file server 208. In another example, interface module 108 may cause computing device 202 to directly instruct the identified client devices to download and execute the software package from file server 208.

In some examples, the installation-management interface generated by interface module 108 may enable the user of computing device 202 to upload the software package to be installed on client devices 212(1)-212(N) to file server 208. In this example, upon receiving the uploaded software package, file server 208 may store the software package in software-package database 120.

In some examples, the system may initiate installation of the software package on a plurality of client devices by instructing each client device to download both the software package in question and a command-line-interpreter file programmed to initiate installation of the software package. For example, in some examples a user of computing device 202 may, by interacting with the installation-management interface generated by interface module 108, upload a custom command-line-interpreter file (such as a batch file or script) to file server 208. In this example, management module 104 may cause management server 206 to instruct client devices 212(1)-212(N) to download both the software package and the command-line-interpreter file uploaded by the user to file server 208. Client devices 212(1)-212(N) may then initiate installation of the software package by downloading both the software package and its associated command-line-interpreter file and then executing the command-line-interpreter file, which may in turn initiate installation of the software package.

Returning to FIG. 3, at step 304 the system may receive, from each client device, a visual image generated during installation of the software package that depicts an installation step that requires user input. For example, window-consolidation module 106 on management server 206 in FIG. 2 may receive, from each of devices 212(1)-212(N) via network 204, a visual image generated during installation of the software package that depicts an installation step that requires user input.

Figure 4:
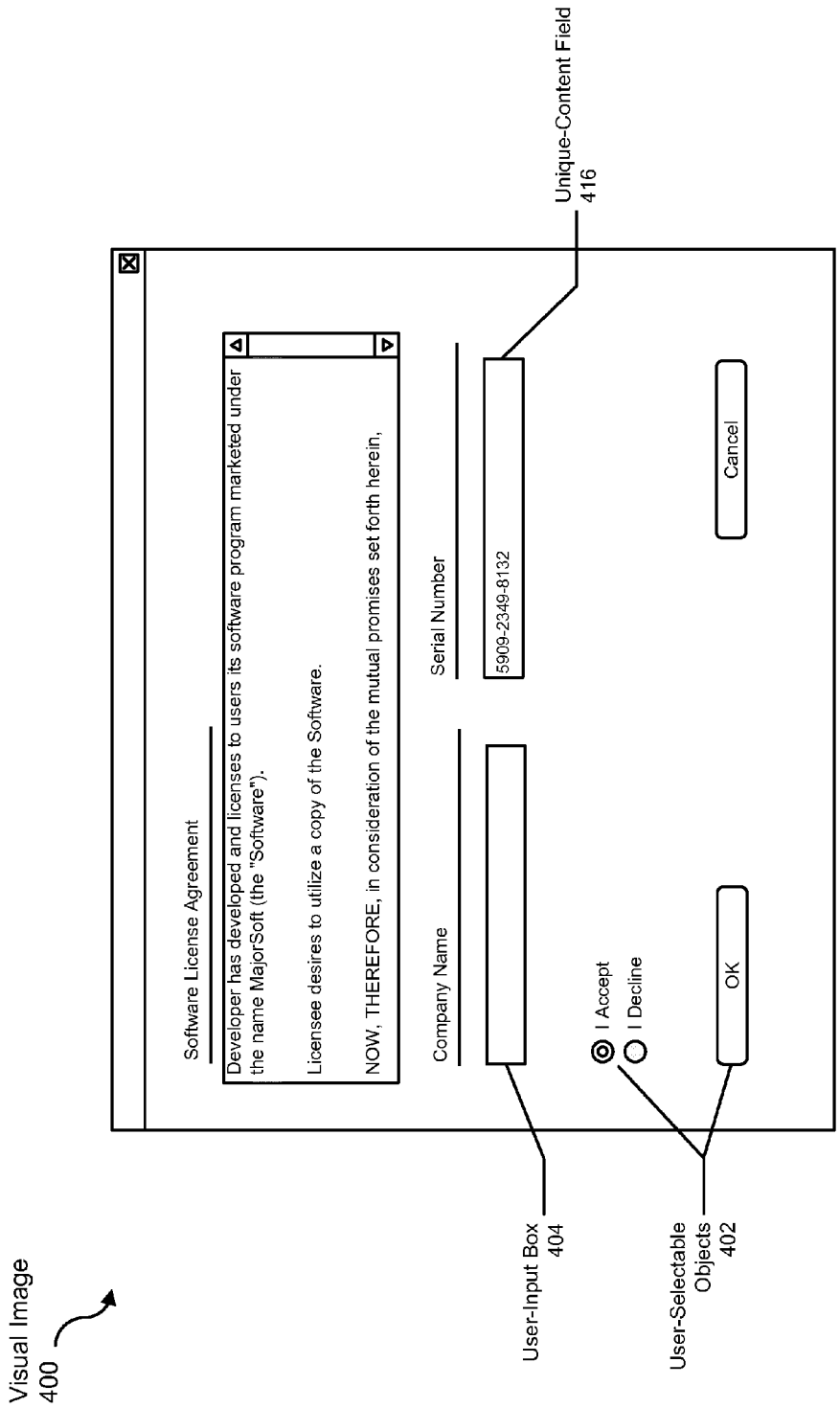
FIG. 4 is an illustration of an exemplary visual image of an installation step that requires user input.

FIG. 4 is an exemplary illustration of a visual image 400 that may be received from each of client devices 212(1)-212(N). In some examples, visual image 400 may represent a screen capture of a window generated by a software application during its installation process. In this example, visual image 400 may represent a screen capture of a window displayed during an installation step in the installation process that requires user input. For example, as illustrated in FIG. 4, the installation window represented in visual image 400 may contain one or more user-selectable objects 402 and/or user-input boxes 404 that require user input in order for the installation process to proceed.

Returning to FIG. 3, at step 306 the system may consolidate the visual images received from the client devices into a consolidated view. For example, window-consolidation module 106 on management server 206 in FIG. 2 may, upon receiving the visual images from client devices 212(1)-212(N), consolidate these visual images into at least one consolidated view.

The system may consolidate visual images into consolidated views in a variety of ways. In some examples, the system may consolidate visual images based on whether the visual images represent instances of the same window displayed during an installation step or instances of two or more different windows displayed during an installation step. For example, in one embodiment window-consolidation module 106 may, by analyzing the visual images received from client devices 212(1)-212(N), determine that each of these visual images merely represents an instance of the same window generated and displayed during an installation step of the installation process. For example, window-consolidation module 106 may determine that each visual image represents a screen capture of the installation window illustrated in FIG. 4.

In this example, upon determining that each visual image represents an instance of the same window, the system may identify differences in content between each instance of the window. For example, window-consolidation module 106 may determine, by analyzing the visual images received from client devices 212(1)-212(N), that at least one of these visual images contains content that differs from at least one other visual image. For example, if window-consolidation module 106 determines that the visual images received in step 304 merely represent instances of the installation window illustrated in FIG. 4, then window-consolidation module 106 may determine that the content of each visual image 400 is identical with the exception of unique-content field 416 (which, in this example, may display a unique serial number for each client device on which the software package is being installed).

Figure 5:
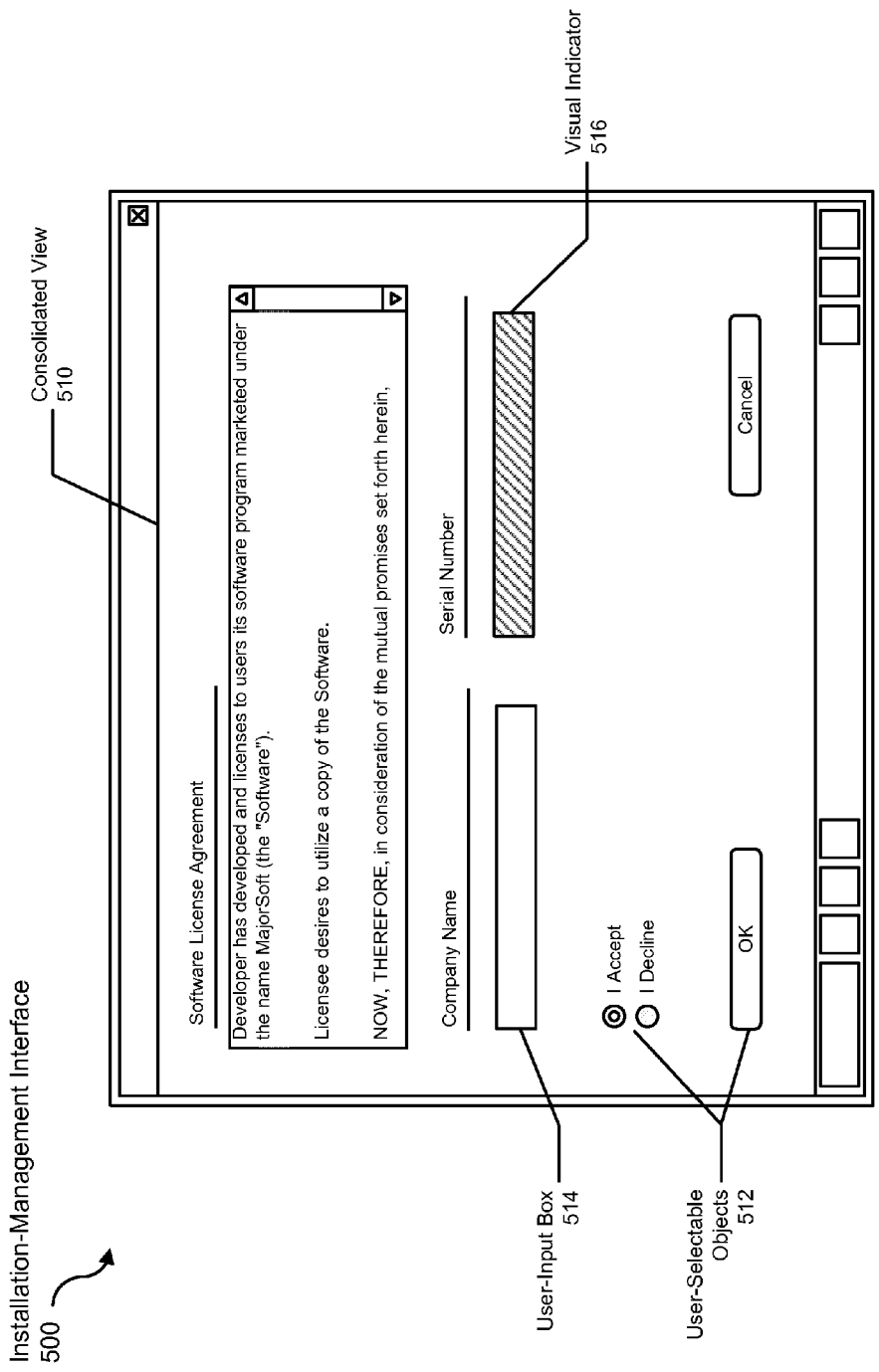
FIG. 5 is an illustration of an exemplary consolidated view of multiple visual images received from a plurality of client devices according to one embodiment.

Upon identifying the differences in content between each visual image (which, in this example, represent instances of the same window), window-consolidation module 106 may generate a single consolidated view that highlights the differences in content between each visual image. For example, as illustrated in FIG. 5, window-consolidation module 106 may generate a single consolidated view 510 of the visual images received from client devices 212(1)-212(N). As illustrated in this figure, consolidated view 510 may highlight differences in content between each visual image. For example, consolidated view 510 may contain a visual indicator 516 within an area that corresponds to a location in the installation window where the differences in content between the visual images occur. In this example, visual indicator 516 may represent a shaded or grayed-out box placed in an area in consolidated view 510 that corresponds to a location originally occupied by unique-content field 416 in the installation window illustrated in FIG. 4. In this example, visual indicator 516 may indicate that content in one or more of the visual images used to generate consolidated view 510 differs in the highlighted location.

As detailed above, in some examples the system may determine that the visual images received from the client devices in step 304 represent instances of two or more different windows displayed during the installation process. For example, window-consolidation module 106 may, by analyzing the visual images received from client devices 212(1)-212(N), determine: 1) that a first subset of these visual images represent instances of a first window displayed during an installation process and 2) that a second subset of these visual images represent instances of a second window displayed during the installation process. For example, window-consolidation module 106 may determine that, out of 100 visual images received from 100 different client devices participating in the installation process, 98 of these visual images represent instances of a window that requires user input (such as the window illustrated in FIG. 4), while the remaining two visual images represent instances of an error message or window displayed during the installation process (such as an error message that indicates that there is insufficient disk space to complete the installation process).

Figure 6:
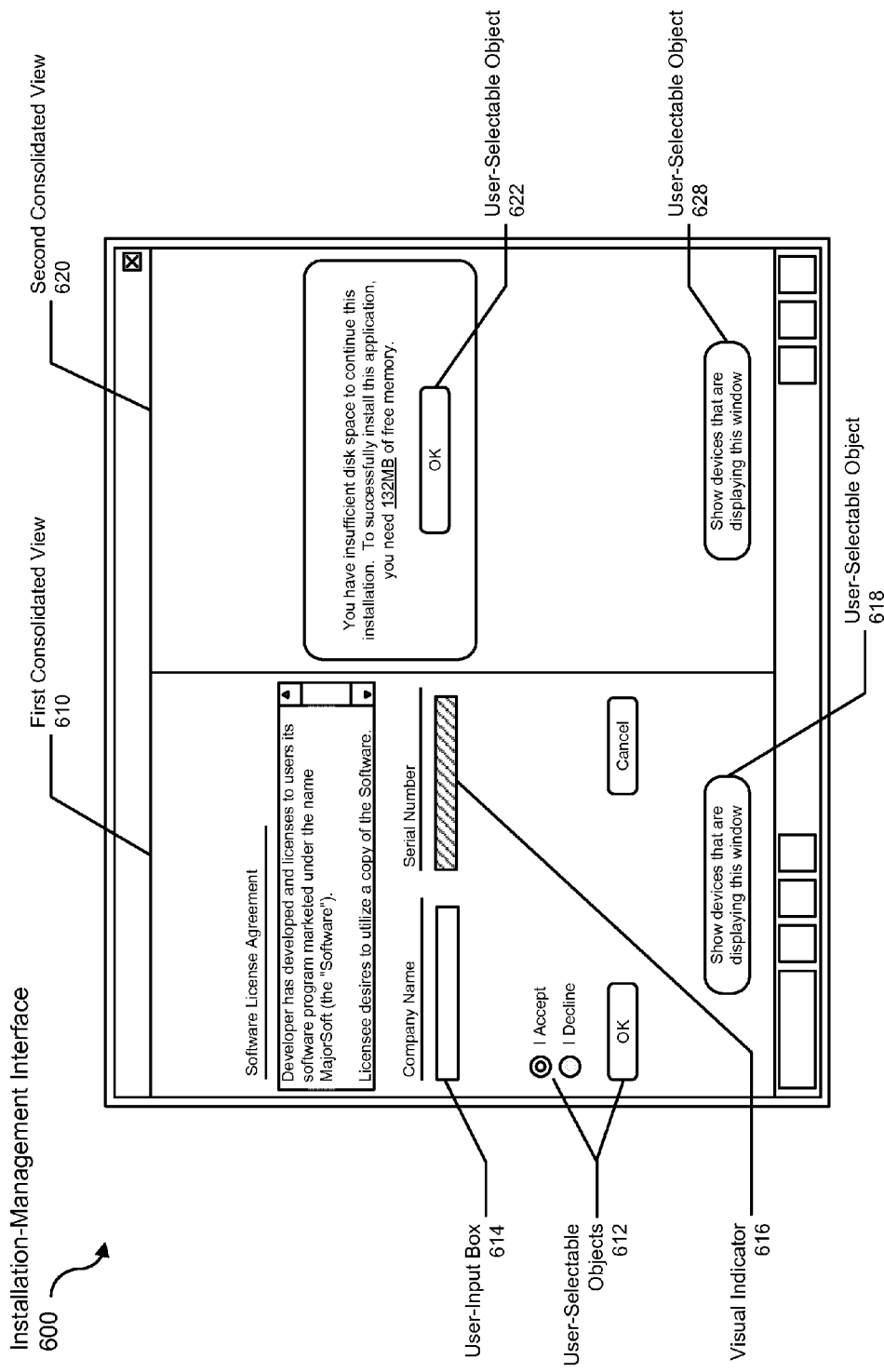
FIG. 6 is an illustration of a plurality of consolidated views of visual images received from a plurality of client devices according to an additional embodiment.

Upon determining that a first subset of the visual images received from the client devices represent instances of the first window while a second subset of the visual images represent instances of a second window, the system may consolidate the first subset into a first consolidated view and the second subset into a second consolidated view. For example, as illustrated in FIG. 6, window-consolidation module 106 may: 1) may consolidate the 98 visual images that represent instances of the window illustrated in FIG. 4 into a first consolidated view 610 and 2) consolidate the remaining two visual images that represent instances of a window that displays an error message generated during an installation process into a second consolidated view 620. As with prior embodiments, window-consolidation module 106 may then identify and highlight any differences in content between the visual images consolidated within each of consolidated views 610 and 620, respectively.

Returning to FIG. 3, at step 308 the system may display, via an installation-management interface, the consolidated view to a user of the computing device. For example, window-consolidation module 106 may, upon consolidating the visual images received from client devices 212(1)-212(N) in step 306, cause management server 206 to transmit this consolidated view to computing device 202 in FIG. 2. Interface module 108 on computing device 202 may then display, by generating an installation-management interface on computing device 202, this consolidated view.

As detailed above, the visual images may be consolidated into a single consolidated view or a plurality of consolidated views. As such, interface module 108 may display, via an installation-management interface on computing device 202, one or more consolidated views. For example, as illustrated in FIG. 5, interface module 108 may display a single consolidated view 510 via installation-management interface 500.

Similarly, as illustrated in FIG. 6, interface module 108 may display a first consolidated view 610 within a first display area of installation-management interface 600 and a second consolidated view 620 within a second display area within installation-management interface 600.

In some examples, the system may display, in response to a request from the user, a list of each client device that is associated with a consolidated view. For example, a user of computing device 202 in FIG. 2 may request that installation-management interface 600 in FIG. 6 display each client device that is currently displaying the installation window represented in first consolidated view 610 by selecting user-selectable object 618. Similarly, the user may cause installation-management interface 600 to display each client device that is currently displaying the installation window represented in second consolidated view 620 by selecting user-selectable object 628.

Moreover, in addition to merely highlighting differences in content between visual images within a consolidated view, the system may also display, in response to a request from the user, the actual content contained in each visual image. For example, interface module 108 may, upon receiving a request from a user of computing device 202, display, via installation-management interface 500 in FIG. 5, information that identifies both: 1) the content that is displayed by each client device in the location highlighted by visual indicator 516 and 2) the client device that is responsible for displaying this content. For example, in the example illustrated in FIG. 5, installation-management interface 500 may display both the serial number that is displayed by each client device in the location highlighted by visual indicator 516 (unique-content field 416 in FIG. 4) and the client device that is responsible for displaying this serial number.

In one example, the system may, by generating and displaying information within an installation-management interface, transform the data received from each client device into a visual representation of this data. For example, interface module 108 on computing device in FIG. 2 may, by generating and displaying consolidated views of screen captures received from client devices 212(1)-212(N) in FIG. 2, transform this screen-capture data into a visual representation of this data.

In some examples, the system may also generate and export, in response to a request from the user, a file that identifies the content contained in each visual image. For example, interface module 108 may, in response to a request from a user of computing device 202, generate and export a file that identifies: 1) the various serial numbers assigned to the client devices participating in the installation process and 2) the client device that is associated with each unique serial number. In some examples, this exported file may contain the visual images themselves, text obtained from the visual images through object-character recognition, and/or information that identifies both data obtained from each screen capture and the client device that is responsible for generating the screen capture.

Returning to FIG. 3, at step 310 the system may receive, via the installation-management interface, user input from the user for completing the installation steps depicted in the visual images received in step 304. For example, interface module 108 on computing device 202 in FIG. 2 may receive, via installation-management interfaces 500 and/or 600 in FIGS. 5 and 6, user input from a user of computing device 202 for completing the installation steps depicted in consolidated views 510, 610, and/or 620.

The system may receive user input in a variety of ways. For example, interface module 108 may receive, via installation-management interfaces 500 and/or 600 in FIGS. 5 and 6, keystrokes (e.g., text entered by a user into user-input boxes 514 and 614 via an input device), mouse clicks (e.g., mouse clicks generated when a user operating a mouse selects user-selectable objects 512 and/or 612), or the like. In examples where an installation-management interface displays more than one consolidated view (such as installation-management interface 600 in FIG. 6, which displays a first consolidated view 610 and a second consolidated view 620), the system may receive a first set of user input for completing the installation step displayed in the first consolidated view and a second set of user input for completing the installation step displayed in the second consolidated view. For example, interface module 108 may receive, via installation-management interface 600, text for entering into user-input box 614 in first consolidated view 616 and a mouse click for selecting user-selectable object 622 in second consolidated view 620.

In some examples, the system may enable the user to upload a file that contains user input for completing the installation step displayed in a consolidated view. For example, if an installation step requires a unique activation key for each client device participating in the installation process, then a user may upload, via the installation-management interface generated by interface module 108 on computing device 202 (e.g., installation-management interfaces 500 and 600 in FIGS. 5 and 6), a file that contains information that identifies: 1) each client device that is participating in the installation process and 2) a unique serial number for each client device.

Returning to FIG. 3, at step 312 the system may complete the installation step by sending the user input received in step 310 to each client device. For example, interface module 108 on computing device 202 in FIG. 2 may transmit user input received via installation-management interfaces 500 and 600 in FIGS. 5 and 6 to management module 104 on management server 206. Management module 104 may then cause management server 206 to transmit this user input to client devices 212(1)-212(N).

The system may perform step 312 a variety of ways. In one example, the system may transmit user input to a client device based on how the user input was received via the installation-management interface. For example, if the user inputs text (such as the company name "MajorCorp.") into user-input box 614 in first consolidated view 610 in FIG. 6, then management module 104 may cause management server 206 to transmit this text to an agent on each client device that generated a visual image that was consolidated in first consolidated view 610. Similarly, if a user selects, using a mouse, one of user-selectable objects 612 (such as "I Accept" and "OK") in first consolidated view 610, then management module 104 may cause management server 206 to transmit information that identifies these selections to an agent on each client device that generated a visual image that was consolidated in first consolidated view 610.

Upon receiving this information (i.e., information that identifies text entered or pointer-based selections made by the user), agents 214(1)-214(N) in FIG. 2 may feed the received information into the installation windows displayed on their respective client devices 212(1)-212(N). For example, agent 214(1) may cause client 212(1) to enter the text "MajorCorp." into a user-input box 404 and then select the user-selectable objects "I Accept" and "OK" in the installation window illustrated in FIG. 4, thus completing the installation step.

Similarly, if a user selects, using a mouse, user-selectable object 622 ("OK") within second consolidated view 620 in FIG. 6, then management module 104 may cause management server 206 to send information that identifies this selection to an agent on each client device that generated a visual image that was consolidated within second consolidated view 620. Upon receiving this information (i.e., information that identifies the pointer-based selection made by the user), agents 214(1)-214(N) in FIG. 2 may feed this information into the installation windows displayed on their respective client devices 212(1)-212(N). For example, agent 214(N) may cause client 212(N) to select the user-selectable object "OK" in the error message represented in second consolidated view 620, thus exiting the installation process. Upon completion of step 312, exemplary method 300 in FIG. 3 may terminate.

By receiving, consolidating, and displaying screenshots of installation steps from multiple devices, the systems and methods described herein may enable an administrator or other user to simultaneously install user-input-dependent software packages on multiple devices. As such, these systems and methods may eliminate the need for the specialized scripts and automation mechanisms that are typically required to automate installations.

Figure 7:
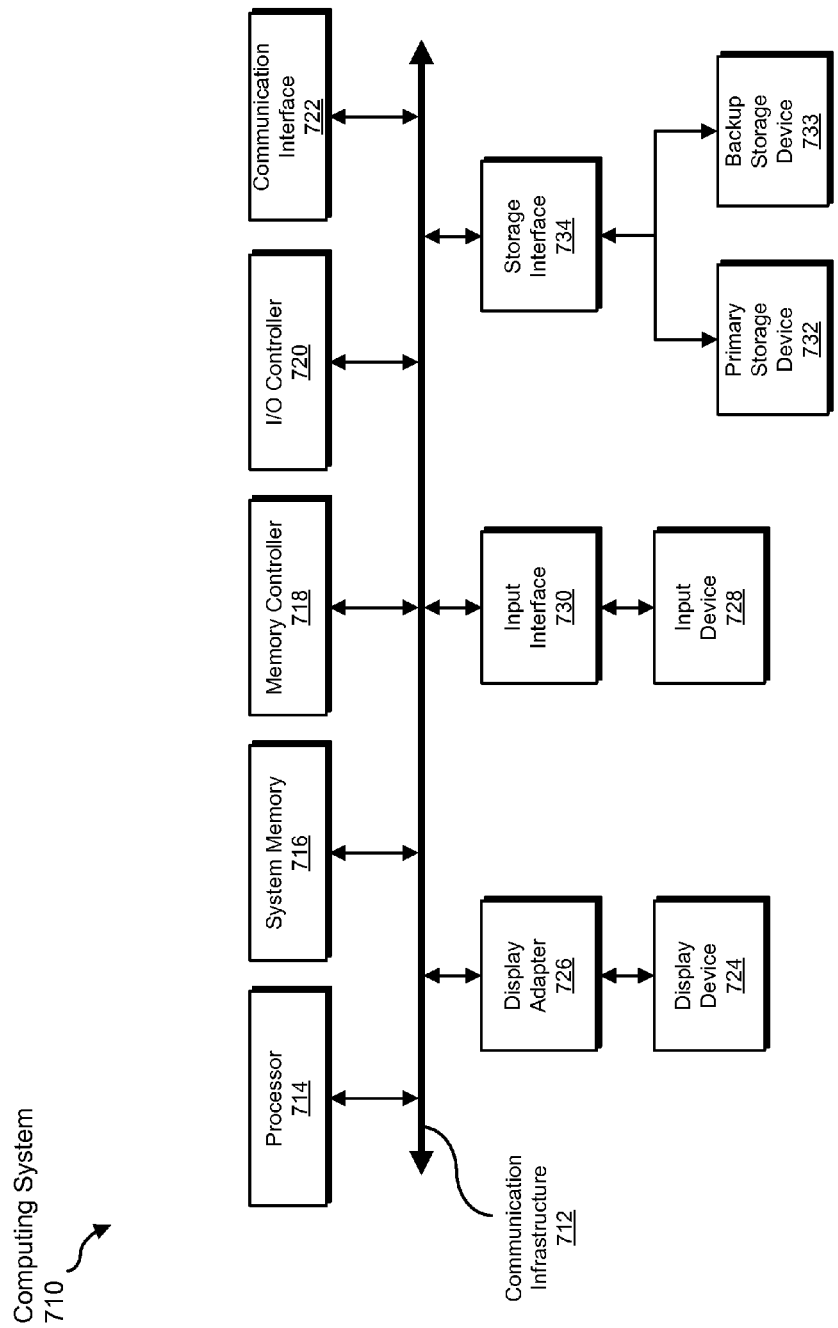
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the initiating, installing, receiving, consolidating, displaying, completing, storing, instructing, determining, identifying, highlighting, placing, generating, and exporting steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as initiating, installing, receiving, consolidating, displaying, completing, storing, instructing, determining, identifying, highlighting, placing, generating, and exporting.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the initiating, installing, receiving, consolidating, displaying, completing, storing, instructing, determining, identifying, highlighting, placing, generating, and exporting steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the initiating, installing, receiving, consolidating, displaying, completing, storing, instructing, determining, identifying, highlighting, placing, generating, and exporting steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the initiating, installing, receiving, consolidating, displaying, completing, storing, instructing, determining, identifying, highlighting, placing, generating, and exporting steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the initiating, installing, receiving, consolidating, displaying, completing, storing, instructing, determining, identifying, highlighting, placing, generating, and exporting steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
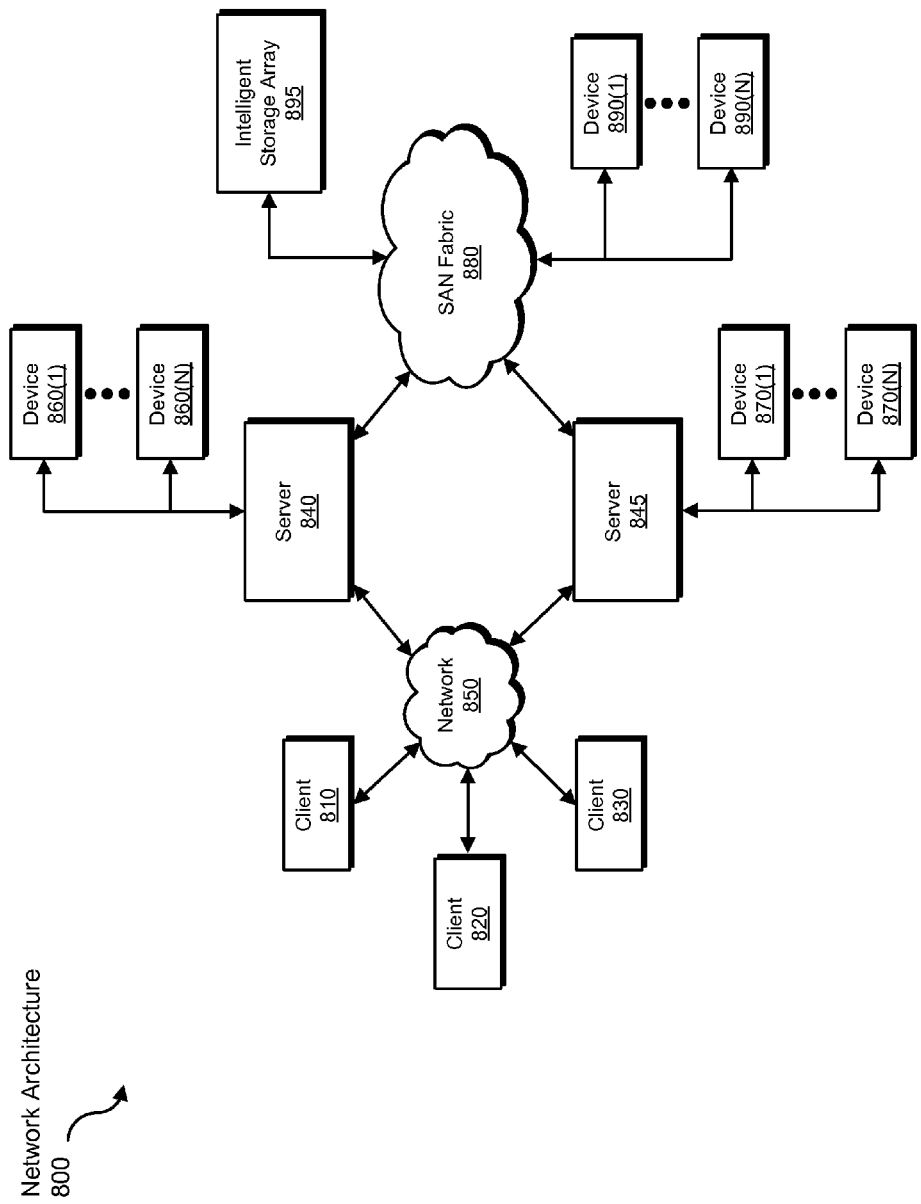
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the initiating, installing, receiving, consolidating, displaying, completing, storing, instructing, determining, identifying, highlighting, placing, generating, and exporting steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for simultaneously installing user-input-dependent software packages on multiple devices. Such a method may comprise: 1) initiating installation of a software package on each of a plurality of client devices, 2) receiving, from each client device, a visual image generated during installation of the software package, the visual image depicting an installation step that requires user input, 3) consolidating the visual images into a consolidated view, 4) displaying, via an installation-management interface, the consolidated view to a user of the computing device, 5) receiving, via the installation-management interface, user input from the user for completing the installation step, and then 6) completing the installation step by sending the user input to each client device.

In some examples, initiating installation of the software package may comprise: 1) receiving, via the installation-management interface, an instruction from the user to initiate installation of the software package on each of the plurality of client devices, 2) storing the software package on a file server, and then 3) instructing each client device to download and execute the software package. The method may also comprise: 1) receiving, via the installation-management interface, a command-line-interpreter file programmed to initiate installation of the software package, 2) storing the command-line-interpreter file with the software package on the file server, and then 3) instructing each client device to download and execute the command-line-interpreter file.

In some examples, consolidating the visual images into the consolidated view may comprise: 1) determining that each visual image represents an instance of a single window displayed during the installation step, 2) identifying differences in content between the instances of the window, and then 3) highlighting, in the consolidated view, the differences in content between the instances of the window. In one embodiment, highlighting the differences in content between the instances of the window may comprise placing a visual indicator within an area in the consolidated view that corresponds to a location in the window where the differences in content between the instances of the window occur. In this example, the method may also comprise displaying, via the installation-management interface, the consolidated view to the user as a single consolidated view in the installation-management interface. The method may also comprise displaying, in response to a request from the user, the differences in content between the instances of the window and/or generating and exporting, in response to a request from the user, a file that identifies the differences in content between the instances of the window.

In another example, consolidating the visual images into the consolidated view may comprise: 1) determining that a first subset of the visual images represent instances of a first window displayed during the installation step, 2) determining that a second subset of the visual images represent instances of a second window displayed during the installation step, 3) consolidating the first subset into a first consolidated view, and then 4) consolidating the second subset into a second consolidated view. In this example, displaying the consolidated view to the user may comprise: 1) displaying the first consolidated view in a first display area in the installation-management interface and 2) displaying the second consolidated view in a second display area in the installation-management interface.

The method may also comprise displaying, in response to a request from the user, a list of each client device that is associated with the first consolidated view and/or a list of each client device that is associated with the second consolidated view. In addition, receiving the user input may comprise: 1) receiving, via the installation-management interface, a first set of user input for completing the installation step on each client device that is associated with the first consolidated view and 2) receiving, via the installation-management interface, a second set of user input for completing the installation step on each client device that is associated with the second consolidated view.

The user input may represent keystrokes, mouse clicks, and/or files that contain user input for completing the installation step. In addition, the plurality of client devices may comprise at least one physical machine and/or at least one virtual machine. The visual image may comprise, for each client device, a screen capture of a window displayed in a graphical user interface on the client device during the installation step.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for simultaneously installing user-input-dependent software packages on multiple devices, at least a portion of the method being performed by a computing device comprising at least one processor, the method comprising:
    initiating installation of a software package on each of a plurality of client devices; receiving, from each of the plurality of client devices, a screen capture of a window generated during an installation step that requires user input;
    determining that a first subset of the screen captures represent instances of a first window generated during the installation step and a second subset of the screen captures represent instances of a second window generated during the installation step;
    consolidating the first subset of the screen captures into a first consolidated view that comprises a single instance of the first window and the second subset of screen captures into a second consolidated view that comprises a single instance of the second window;
    identifying differences in content between the screen captures consolidated within the first consolidated view and differences in content between the screen captures consolidated within the second consolidated view;
    highlighting, in the first consolidated view, the differences in content between the screen captures consolidated within the first consolidated view by placing a visual indicator within an area of the first consolidated view that corresponds to a location in the first window where the differences in content occur;
    highlighting, in the second consolidated view, the differences in content between the screen captures consolidated within the second consolidated view by placing a visual indicator within an area of the second consolidated view that corresponds to a location in the second window where the differences in content occur;
    displaying, via an installation-management interface, the first consolidated view and the second consolidated view to a user of the computing device;
    receiving, from the user, via the installation-management interface, a first set of user input for completing the installation step as displayed in the first consolidated view and a second set of user input for completing the installation step as displayed in the second consolidated view;
    simultaneously completing the installation step by sending the first set of user input, received via the installation-management interface, to each of the plurality of client devices that is associated with the first consolidated view and the second set of user input, received via the installation-management interface, to each of the plurality of client devices that is associated with the second consolidated view.

2. The method of claim 1, wherein initiating the installation of the software package comprises:
    receiving, via the installation-management interface, an instruction from the user to initiate the installation of the software package on each of the plurality of client devices;
    storing the software package on a file server;
    instructing each of the plurality of client devices to download and execute the software package.

3. The method of claim 2, further comprising:
    receiving, via the installation-management interface, a command-line-interpreter file programmed to initiate the installation of the software package;
    storing the command-line-interpreter file with the software package on the file server;
    instructing each of the plurality of client devices to download and execute the command-line-interpreter file.

4. The method of claim 1, wherein the first window and the second window comprise at least one of:
    a user-input box that requires input;
    a user selectable object that requires input.

5. The method of claim 1, further comprising, in response to a request from the user, displaying the actual content that is displayed by each client device in the areas highlighted by the visual indicators.

6. The method of claim 1 further comprising at least one of:
    displaying, in response to a request from the user, the differences in content between the screen captures consolidated within the first consolidated view and the differences in content between the screen capture consolidated within the second consolidated view;

generating and exporting, in response to a request from the user, a file that identifies the differences in content between the subset of the screen captures.

7. The method of claim 1 wherein displaying, via the installation-management interface, the first consolidated view and the second consolidated view to the user comprises:
  displaying the first consolidated view in a first display area in the installation-management interface;
  displaying the second consolidated view in a second display area in the installation-management interface.

8. The method of claim 7, further comprising displaying, in response to a request from the user:
  a list of each client device that is associated with the first consolidated view;
  a list of each client device that is associated with the second consolidated view.

9. The method of claim 1, wherein receiving the first set of user input and the second set of user input comprises receiving, via the installation-management interface, at least one of:
  keystrokes;
  mouse clicks;
  a file that contains user input for completing the installation step.

10. The method of claim 1, wherein the pluralities of client devices comprise at least one of:
  at least one physical machine;
  at least one virtual machine.

11. A system for simultaneously installing user-input-dependent software packages on multiple devices, the system comprising:
  a management module programmed to initiate installation of a software package on each of a plurality of client devices;
  a window-consolidation module programmed to:
    receive, from each of the plurality of client devices, a screen capture of a window generated during an installation step that requires user input;
    determine that a first subset of the screen captures represent instances of a first window generated during the installation step and a second subset of the screen captures represent instances of a second window generated during the installation step;
    consolidate the first subset of the screen captures into a first consolidated view that comprises a single instance of the first window and the second subset of screen captures into a second consolidated view that comprises a single instance of the second window;
    identify differences in content between the screen captures consolidated within the first consolidated view and differences in content between the screen captures consolidated within the second consolidated view;
    highlight, in the first consolidated view, the differences in content between the screen captures consolidated within the first consolidated view by placing a visual indicator within an area of the first consolidated view that corresponds to a location in the first window where the differences in content occur;
    highlight, in the second consolidated view, the differences in content between the screen captures consolidated within the second consolidated view by placing a visual indicator within an area of the second consolidated view that corresponds to a location in the second window where the differences in content occur;
  an interface module programmed to:
    display, via an installation-management interface, the first consolidated view and the second consolidated view to a user of a computing device;
    receive, from the user, via the installation-management interface, a first set of user input for completing the installation step as displayed in the first consolidated view and a second set of user input for completing the installation step as displayed in the second consolidated view;
  at least one processor configured to execute at least one of the management module, the window-consolidation module, and the interface module;
  wherein the management module is further programmed to simultaneously complete the installation step by sending the first set of user input, received via the installation-management interface, to each of the plurality of client devices that is associated with the first consolidated view and the second set of user input, received via the installation-management interface, to each of the plurality of client devices that is associated with the second consolidated view.

12. The system of claim 11 wherein the interface module displays the first consolidated view and the second consolidated view by:
  displaying the first consolidated view in a first display area in the installation-management interface;
  displaying the second consolidated view in a second display area in the installation-management interface.

13. A non-transitory computer-readable storage medium comprising computer-readable instructions that, when executed by a processor of a computing device, cause the computing device to:
  initiate installation of a software package on each of a plurality of client devices;
  receive, from each of the plurality of client devices, a screen capture of a window generated during an installation step that requires user input;
  determine that a first subset of the screen captures represent instances of a first window generated during the installation step and a second subset of the screen captures represent instances of a second window generated during the installation step;
  consolidate the first subset of the screen captures into a first consolidated view that comprises a single instance of the first window and the second subset of screen captures into a second consolidated view that comprises a single instance of the second window;
  identify differences in content between the screen captures consolidated within the first consolidated view and differences in content between the screen captures consolidated within the second consolidated view;
  highlight, in the first consolidated view, the differences in content between the screen captures consolidated within the first consolidated view by placing a visual indicator within an area of the first consolidated view that corresponds to a location in the first window where the differences in content occur;
  highlight, in the second consolidated view, the differences in content between the screen captures consolidated within the second consolidated view by placing a visual indicator within an area of the second consolidated view that corresponds to a location in the second window where the differences in content occur;
  display, via an installation-management interface, the first consolidated view and the second consolidated view to a user of the computing device;
  receive, from the user, via the installation-management interface, a first set of user input for completing the installation step as displayed in the first consolidated view and a second set of user input for completing the installation step as displayed in the second consolidated view;

simultaneously complete the installation step for each of the plurality of client devices by sending the first set user input, received via the installation-management interface, to each of the plurality of client devices that is associated with the first consolidated view and the second set of user input, received via the installation-management interface, to each of the plurality of client devices that is associated with the second consolidated view.

14. The method of claim 1, wherein the second window comprises an error window.

15. The method of claim 14, wherein the error window indicates that there is insufficient disk space to complete the installation of the software package.

16. The method of claim 1, wherein the visual indicator within the area to the first consolidated view and the visual indicator within the area of the second consolidated view comprise at least one of:

a shaded box that corresponds to a location originally occupied by a unique-content field;

a grayed-out box that corresponds to a location originally occupied by a unique-content field.

17. The method of claim 3, wherein the command-line-interpreter file comprises at least one of: a batch file; a script file.

18. The method of claim 5, wherein the actual content comprises at least one of:

a serial number;

a client device.

19. The method of claim 8, wherein displaying the list of each client device that is associated with the first consolidated view and each client device that is associated with the second consolidated view comprises displaying a list of each client device that is currently displaying an instance of at least one of the first window or the second window.

20. The method of claim 9, further comprising sending the first set of user input and the second set of user input to each of the plurality of client devices based on how the user input was received via the installation-management interface.

\* \* \* \* \*

UNITED STATES PATENT AND TRADEMARK OFFICE
CERTIFICATE OF CORRECTION

| | | |
|---|---|---|
| PATENT NO. | : 8,924,957 B1 | Page 1 of 1 |
| APPLICATION NO. | : 12/412721 | |
| DATED | : December 30, 2014 | |
| INVENTOR(S) | : Keith Newstadt et al. | |

It is certified that error appears in the above-identified patent and that said Letters Patent is hereby corrected as shown below:

In the Claims

Claim 10, at column 19, lines 24-25, should read:

The method of claim 1, wherein the plurality of client devices comprise at least one of:

Claim 13, at column 21, line 5, should read:

the plurality of client devices by sending the first set of user

Signed and Sealed this
Twenty-third Day of June, 2015

Michelle K. Lee
*Director of the United States Patent and Trademark Office*